(12) United States Patent
Polato et al.

(10) Patent No.: US 12,281,364 B2
(45) Date of Patent: Apr. 22, 2025

(54) COMBINED MACHINE FOR THE THERMIC DRYING TREATMENT OF DIELECTRIC PRODUCTS

(71) Applicant: OFFICINE DI CARTIGLIANO S.P.A., Cartigliano (IT)

(72) Inventors: Antonio Polato, Marostica (IT); Fernando Bressan, Grantorto (IT)

(73) Assignee: OFFICINE DI CARTIGLIANO S.P.A., Cartigiano (IT)

( * ) Notice: Subject to any disclaimer, the term of this patent is extended or adjusted under 35 U.S.C. 154(b) by 754 days.

(21) Appl. No.: 17/432,381

(22) PCT Filed: Feb. 19, 2020

(86) PCT No.: PCT/IB2020/051368
§ 371 (c)(1),
(2) Date: Aug. 19, 2021

(87) PCT Pub. No.: WO2020/170145
PCT Pub. Date: Aug. 27, 2020

(65) Prior Publication Data
US 2023/0203605 A1    Jun. 29, 2023

(30) Foreign Application Priority Data
Feb. 20, 2019   (IT) .................. 102019000002463

(51) Int. Cl.
*C14B 1/58*       (2006.01)
*F26B 3/347*     (2006.01)
(Continued)

(52) U.S. Cl.
CPC .............. *C14B 1/58* (2013.01); *F26B 3/347* (2013.01); *F26B 5/04* (2013.01); *H02P 9/42* (2013.01)

(58) Field of Classification Search
CPC ... F26B 3/347; F26B 5/04; C14B 1/58; H02P 9/42
(Continued)

(56) References Cited

U.S. PATENT DOCUMENTS 6,192,599 B1 *  2/2001  Bryant ................... F26B 13/10
                                                            34/400
7,334,346 B2 *  2/2008  Nomine ................... F26B 5/06
                                                            34/92
(Continued)

FOREIGN PATENT DOCUMENTS

CN    204385215 U    6/2015
DE    3521061 A1    12/1986
(Continued)

OTHER PUBLICATIONS

International Search Report & Written Opinion received for the PCT Application No. PCT/IB2020/051368, mailed on Jun. 4, 2020, 10 pages.

*Primary Examiner* — Stephen M Gravini
(74) *Attorney, Agent, or Firm* — Amster, Rothstein & Ebenstein LLP

(57) ABSTRACT

A combined machine for the thermic drying treatment of dielectric products includes a box-like casing which defines a process chamber or cavity configured to receive a dielectric product placed on support means and to be thermally treated to obtain the drying thereof. A pumping means is operatively connected to the box-like casing and configured to be operated to create vacuum conditions inside the process chamber or cavity in the presence of the dielectric product. In particular, the combined machine includes an electric generator configured to generate a radio frequency output signal, at the desired output power, and applicator means, contained in the process chamber or cavity and electrically connected with the electric generator, configured (Continued)

to develop an electromagnetic field at a treatment zone of the dielectric product defined in the process chamber or cavity for heating the dielectric product itself.

13 Claims, 1 Drawing Sheet

(51) Int. Cl.
*F26B 5/04* (2006.01)
*H02P 9/42* (2006.01)

(58) Field of Classification Search
USPC .......................................................... 34/92
See application file for complete search history.

(56) References Cited

U.S. PATENT DOCUMENTS

| | | | | |
|---|---|---|---|---|
| 9,080,961 | B2* | 7/2015 | Adachi | ............... G01N 21/3554 |
| 9,810,480 | B2* | 11/2017 | Sears | ....................... F26B 17/12 |
| 10,195,543 | B2* | 2/2019 | Wilson | ................... B01D 63/06 |
| 10,351,478 | B2* | 7/2019 | Quinn | ................. C04B 40/0231 |
| 10,815,570 | B2* | 10/2020 | Outten | ................... C23C 16/505 |
| 11,466,932 | B2* | 10/2022 | Baussaron | ................. A23L 3/54 |
| 11,545,329 | B2* | 1/2023 | Kyrytsya | ................. H01J 19/78 |
| 11,832,698 | B2* | 12/2023 | Wang | ..................... A45D 20/12 |
| 2002/0047009 | A1 | 4/2002 | Flugstad et al. | |
| 2023/0203605 | A1* | 6/2023 | Polato | ....................... H02P 9/42 |
| | | | | 34/92 |
| 2023/0405870 | A1* | 12/2023 | Toncelli | ................. B32B 25/10 |

FOREIGN PATENT DOCUMENTS

| | | | | | |
|---|---|---|---|---|---|
| GB | 2073241 | A | | 10/1981 | |
| IL | 285481 | A | * | 9/2021 | ............... C14B 1/58 |
| JP | 2009-250474 | A | | 10/2009 | |
| JP | 2022521726 | A | * | 4/2022 | |
| WO | WO-2020170145 | A1 | * | 8/2020 | ............... C14B 1/58 |

* cited by examiner

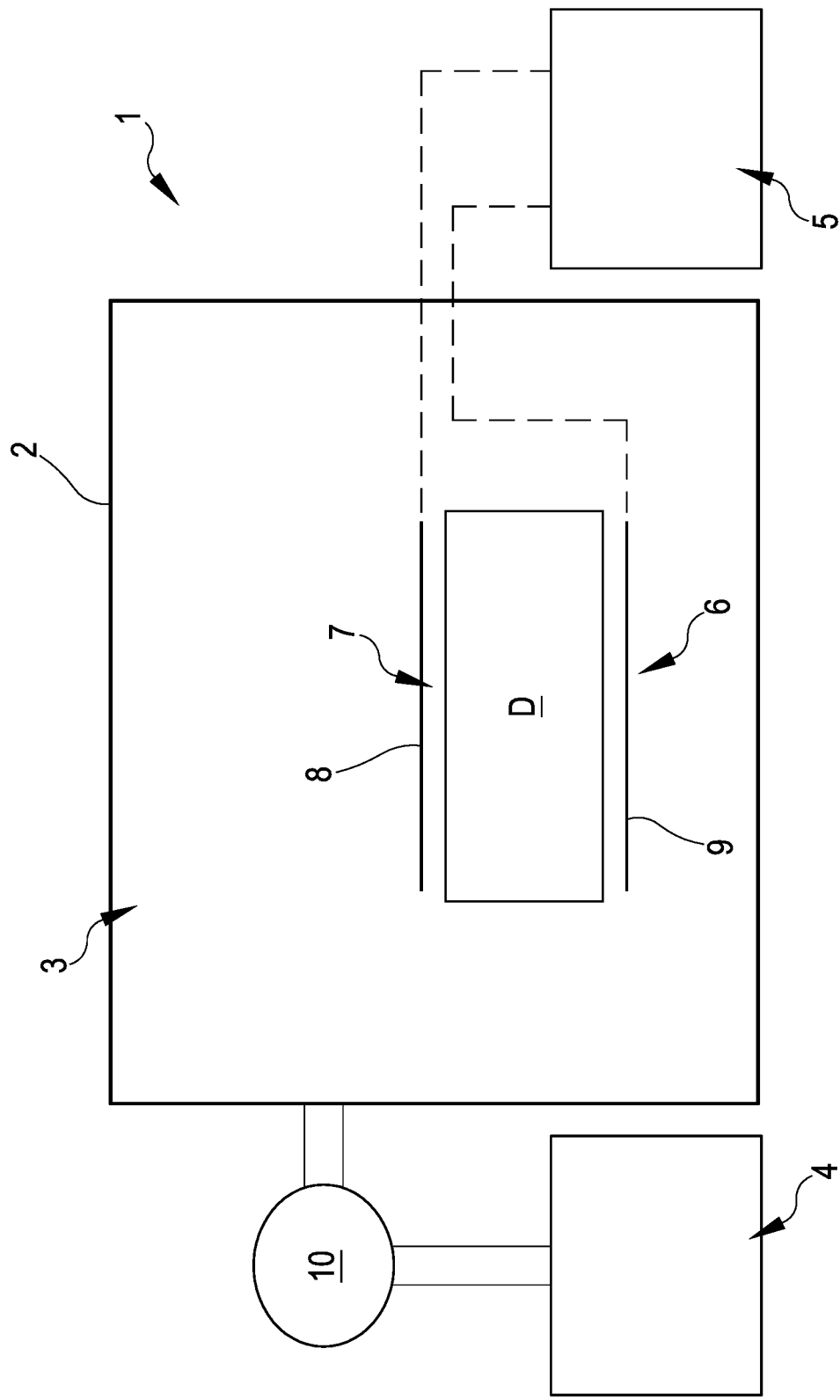

COMBINED MACHINE FOR THE THERMIC DRYING TREATMENT OF DIELECTRIC PRODUCTS

CROSS REFERENCE TO RELATED APPLICATIONS

This application claims benefit under 35 U.S.C. § 371 to international application No. PCT/IB2020/051368 filed on Feb. 19, 2020, which claims priority Italian application No. 102019000002463, filed Feb. 20, 2019, the contents of which are incorporated by reference in their entireties.

FIELD OF INVENTION

The present invention relates to an improved combined machine for the thermic drying treatment of dielectric products, e.g., such as animal hides in the tanning industry, solid and/or liquid foodstuffs, such as milk to be freeze-dried, and polymers in the form of granules or flakes, by applying oscillating radio frequency electromagnetic fields.

BACKGROUND OF RELATED PRIOR ART

It is known that radio frequency equipment for the thermic drying treatment of materials or dielectric products has been used extensively for years and in a variety of fields of the art, in which it is necessary to heat dielectric material.

The aforesaid radio frequency equipment is used in drying and/or dehumidifying treatments in the production cycles of hides in the tanning industry, in the treatment of food products, e.g., in milk freeze-drying or pasteurization treatments, as well as in the treatment of polymeric substances, e.g., liquefy them.

The known types of radio frequency equipment generally comprise an electric generator capable of generating an oscillating voltage at a predetermined frequency in the radio frequency field (hereinafter referred to as RF generator for ease of presentation) and a unit connected thereto by means of which the oscillating electromagnetic field is applied to the dielectric product to be treated/heated.

Such a unit, commonly known as the applicator, has appropriate conformations according to the nature of the product to be treated. In its basic configuration, it substantially consists of two or more appropriately shaped electrodes which, in a closed process chamber or cavity, define a treatment area in which the product to be heated is positioned or through which it passes.

Different types of applicator can be identified according to the spatial arrangement of the electrodes and of the type of connection to the RF generator, e.g. in "stray-field" or "string-field" configurations (or geometries) (in which all the electrodes are arranged at only one side of the dielectric product to be treated) or in "staggered" configurations (in which the electrodes are arranged at multiple sides of the dielectric product to be treated, with the positive electrodes placed on the same side with respect to the support means—either movable or fixed—which receive the dielectric product to be treated, and the negative electrodes placed on the opposite side).

In operation, the applicator and the dielectric material to be heated define the load for the RF generator.

Drying by means of radio frequency systems (27.12 MHz) thus exploits the principle according to which water vapor always moves from the hot to the cold areas. By concerning the dielectric product to be treated in a treatment area in which a radio frequency electromagnetic field of appropriate intensity is present, heat is generated in a volumetric manner directly in the dielectric product itself, without the aid of heat-carrying means (air, water or fluids in general).

Other types of alternative devices or systems used for drying dielectric products in the fields already identified above, such as, in particular, machines which use the vacuum technique, are also currently known.

Vacuum drying uses the principle according to which evaporation is achieved at lower temperatures (e.g., at 40° C. and 7.4 kPa) than atmospheric pressure (100° C. and 101.3 kPa) by reducing the pressure of the water contained in the dielectric product to be treated to dry it.

The prior art does not, in any case and in any manner, provide machines or devices which can exploit, at the same time, the operational advantages associated with vacuum drying and with drying by means of radio frequency systems, which represents a technical evolution with respect to the more traditional vacuum drying method by providing, for example, very appropriately, less invasiveness on the dielectric product to be treated and lower consumption of resources, because it is not accompanied by the consumption of hot water.

Indeed, in the fields mentioned above, in particular, in the animal hide tanning industry, the two technologies are used as mutual alternatives, according to requirements, the type of dielectric product to be treated and, in part, also the space available in the plant.

Substantially, especially under certain operating conditions and in presence of given materials to be treated, the performance of the machinery currently used to dry the materials themselves is not optimal and can be greatly improved, as always desired by those who carry out the treatment in their plants and purchase such machinery.

An exception to what has been illustrated in the three paragraphs above is the drying device for hides, furs and the like described in prior patent document DE3521061 A1, which is to be considered the closest prior art of the present invention.

SUMMARY

Therefore, starting from the awareness of the aforesaid limitation in the prior art, the present invention suggests remedying fully and effectively the aforesaid disadvantages suffered by the prior art considered hereto.

In particular, it is the primary purpose of the present invention to provide a combined machine for the thermic drying treatment of dielectric products with higher efficiency than that of the equivalent machines of the prior art.

In other words, it is the predominant purpose of the present invention to provide a combined machine for the thermic drying treatment of dielectric products which has the advantages of the vacuum drying devices and of the radio frequency drying devices currently available on the market but which are mutually used either separately or alternatively.

Within the scope of such an object, it is therefore task of the invention to design a combined machine which, all other factors involved in the calculation of the production cost being equal, allows reducing the costs required for the thermic drying treatment of dielectric products compared to the prior art.

In the cognitive sphere of the aforesaid main purpose, it is a further task of the present invention itself to indicate a combined machine for the thermic drying treatment of dielectric products which can meet the needs of the market more than that permitted by similar known machines.

It is a second purpose of the present invention to manufacture a combined machine for the thermic drying treatment of dielectric products which present small overall dimensions, smaller than those ones of the machines of known type.

It is a last but not least purpose of the invention to manufacture a combined machine for the thermic drying treatment of dielectric products which has low consumption of energy or other resources, such as hot water, lower than those ones found in vacuum drying devices while reducing the risks of electrical discharges inside the process chamber or cavity (or treatment or working cavity) compared to radio frequency drying devices.

Said purposes are achieved by a combined machine for the thermic drying treatment of dielectric products according to appended claim 1, to which reference should be made for the sake of brevity.

Further detailed technical features of the combined machine for the thermic drying treatment of dielectric products according to the present invention are contained in the respective dependent claims.

The aforesaid claims, hereinafter specifically and concretely defined, are integral part of the present description.

Advantageously, the combined machine for the thermic drying treatment of dielectric products of the invention achieves higher production efficiencies than comparable machines of known type.

This is due favorably to the fact that, in the invention, the combined machine for the thermic drying treatment of dielectric products comprises an electric generator which generates a radio frequency output signal, at a desired output power, and applicator means, contained in the process chamber or cavity in which vacuum is achieved by pumping means electrically connected to the electric generator, the applicator means developing an electromagnetic field at a defined dielectric product treatment area in the process chamber or cavity to heat the dielectric product and cause the subsequent drying thereof.

Equally advantageously, the combined machine for the thermic drying treatment of dielectric products according to the present invention can more effectively meet the increasingly stringent and demanding customer requirements.

Still advantageously, the combined machine for the thermic drying treatment of dielectric products of the invention has small overall dimensions and a slim and simple construction concept, such as to be particularly attractive to customers.

Equally advantageously, the combined machine for the thermic drying treatment of dielectric products of the invention allows reducing, on the one hand, the consumption of energy or other resources such as hot water compared to vacuum drying machines while reducing, on the other hand, the risks of electrical discharges inside the process chamber or cavity compared to radio frequency drying machines.

The aforesaid purposes and advantages, as well as others that will emerge below, will become more apparent from the following description, relating to a preferred embodiment of the combined machine for the thermic drying treatment of dielectric products of the present invention, given by way of non-limiting example with reference to the accompanying drawing which contains only FIG. 1 in which the combined machine for the thermic drying treatment of dielectric products of the invention is shown by means of a diagrammatic, simplified and therefore explanatory view of the main inventive technical concept expressed thereby.

BRIEF DESCRIPTION OF THE DRAWING

FIG. 1 is a schematic view of a combined machine for the thermic drying treatment of dielectric products (e.g., animal hides from the tanning industry, foodstuffs such as milk or polymers in granular or flake form and the like).

DETAILED DESCRIPTION

As can be seen, the combined machine 1 for the thermic drying treatment of dielectric products, indicated with D in the attached FIG. 1, comprises:

a box-like casing 2, made of any material compatible with its intended use, which defines a process chamber or cavity 3 immersed in air and adapted to accommodate the dielectric product D, such as an animal hide or a foodstuff, placed on support means (not shown for the sake of convenience and comprising, for example, a conveyor belt) and to be heat-treated to dry it; pumping means, indicated as a whole by reference numeral 4 and typically consisting of a vacuum pump, operationally (i.e., hydraulically) connected to the box-like housing 2 and adapted to be operated or activated to create conditions of vacuum inside the process chamber or cavity 3 in the presence of the dielectric product D.

According to the invention, the combined machine 1 includes an electric generator 5 which generates a radio frequency output signal, at the desired output power, and applicator means, indicated as a whole by reference numeral 6, contained in the process chamber or cavity 3 and electrically connected to the aforesaid electric generator 5; these applicators develop an electromagnetic field at a defined treatment zone 7 of the dielectric product D within the process chamber or cavity 3 to heat the dielectric product D itself.

In particular, the electric generator 5 includes a unit for the generation of radio frequency signals at a first power level, and amplification means, electrically connected to the generation unit, adapted to amplify said radio frequency signals of the generation unit from the first power level to the output power.

Preferably but not necessarily albeit advantageously, the amplification means comprise one or more amplification stages, each of which includes an active solid-state electronic component. This allows a significant reduction of the size of the electric generator, and more generally of the combined machine of the invention.

Even more preferably, the solid-state active electronic component of the amplification stages is of the silicon or gallium nitride semiconductor type.

As known, a solid-state generator is a generator which uses a means of energy gain but has no movable parts. By way of example, semiconductor generators—a particular type of thermoelectric generator—are a typical example of a solid-state generator.

The radio frequency output signal has a frequency of value comprised in the 300 Khz-300 MHz range, preferably equal to 13.56 MHz or equal to 27.12 MHz or equal to 40.68 MHz.

In further executive variants of the combined machine of the invention, not shown below, the radio frequency signal generation unit at a first power level may include a high voltage oscillating/resonant circuit (e.g., a triode).

According to the preferred embodiment of the invention described herein, the applicators 6 comprise a pair of opposing polarity electrodes 8, 9 facing each other, mutually arranged according to a preset configuration, chosen as desired by the manufacturer or according to the customer's needs.

In this case, the predetermined configuration is of the type in which said opposite polarity electrodes 8, 9 face each other, are parallel and spaced apart in such a way that:

the treatment zone 7 is comprised between the electrodes 8, 9 adapted to be arranged at two opposite sides of the dielectric product D, with the positive electrode placed at a first side of the dielectric product D and the negative electrode placed at a second side of the dielectric product D, in general opposite to the first side;

the electromagnetic field generated by the electrodes 8, 9 is predominantly orthogonal to the dielectric product D which is transiting (if placed on a conveyor belt) or fixed in the treatment zone 7.

In other construction solutions of the combined machine of the invention, not accompanied by reference drawings, the predetermined configuration taken by the electrodes is of the type in which such opposite polarity electrodes face each other and are parallel to each other so that:

the treatment zone is arranged above or below both the electrodes adapted to be arranged at only one side of the dielectric product to be treated;

the electromagnetic field generated by the electrodes is mainly tangential to the dielectric product to be treated.

In a preferred but not binding manner, each of the electrodes 8, 9 is composed of a plurality of consecutive electrodes, each of which has the same polarity (in the case of electromagnetic field predominantly orthogonal to the dielectric product D) or opposite polarity (in the case of electromagnetic field predominantly tangential or parallel to the dielectric product) with respect to the electrode aligned and adjacent thereto (e.g. in a direction parallel to the feeding direction of the dielectric product on the movable support means).

This constructional expedient, due in practice to the breakdown of each of the general electrodes 8, 9 into a plurality of sub-electrodes (or elementary electrodes), allows the combined machine 1 of the invention to obtain, on the one hand, non-trivial and non-negligible operational advantages (during operation), such as, for example, a greater uniformity in the heating treatment of the dielectric product D, and a punctual, selective and diversified heating of the dielectric product D.

On the other hand, such a breakdown of the electrodes 8, 9 into a plurality of elementary electrodes allows achieving equally important management advantages (during the possible and inevitable, at least periodic and scheduled downtimes), such as, for example, greater simplicity in the maintenance, repair and/or replacement of the electrodes which can thus be localized and limited to the single elementary electrode(s) and not concern the entire component, to the advantage of the associated costs.

These operational and management advantages are in no manner reflected in the available prior art, not even in the prior document published under number DE3521061 A1.

As can be seen in FIG. 1, the electrodes 8, 9 (which can take any spatial arrangement in the process chamber or cavity 3) comprise separate components of the box-like casing 2.

It is understood that in alternative embodiments of the combined machine of the present invention, not shown in the accompanying drawings, the electrodes may comprise two opposite portions (uniform or monolithic or divided into separate pieces placed side-by-side) of the inner wall of the box-like casing.

The combined machine 1 of the instant invention also comprises a capacitor 10 interposed between the pumping means 4 and the box-like housing: the function of the capacitor 10 is to condense the vapor in excess with respect to the capacity of the pumping means 4 (such as the mentioned vacuum pump).

Preferably but not exclusively, although appropriately, the combined machine 1 of the present invention comprises detecting means (not shown for the sake of simplicity but of the type known to the person skilled in the art) of the temperature and/or humidity present in the process chamber or cavity 3, operationally connected to the box-like casing 2 and adapted to adjust the input power of the radio frequency electric generator 5 and/or the level of the vacuum conditions in the process chamber or cavity 3 generated by the pumping means 4.

By virtue of the aforesaid description, it is thus apparent that the combined machine for the thermic drying treatment of dielectric products according to the present invention achieves the purposes and reaches the advantages yet mentioned.

Upon implementation, modifications could be made to the combined machine for the thermic drying treatment of dielectric products of the invention, e.g., consisting of pumping means of a different type from the one mentioned in the preceding part of the description, provided they are adapted to create and maintain the vacuum conditions of (in which pressure is lower than atmospheric pressure).

Additionally, further construction solutions of the combined machine for the thermic drying treatment of dielectric products claimed herein exclusively, not illustrated in the attached figures, may provide that the electric generator has a different construction concept from the preferred one described above, which does not impair the advantage brought by this invention.

Finally, it is apparent that many other variants may be made to the combined machine for the thermic drying treatment of products concerned electromechanical device, without departing from the principles of novelty inherent in the inventive idea, just as it is apparent that in the practical implementation of the invention, the materials, shapes, and sizes of the details shown may be any according to the requirements and may be replaced by other technically equivalent elements. Where the constructional features and techniques mentioned in any successive claims are followed by references signs or numerals, such reference signs were introduced for the sole purpose of increasing intelligibility of the claims themselves, and therefore such reference signs have no limiting effect on the interpretation of each element identified by way of example only by such reference signs.

What is claimed is:

1. A machine for providing thermic drying treatment of a dielectric product comprising:

box-like casing which defines a process chamber or cavity suitable for receiving a dielectric product placed on a supporting system and to be thermally treated to obtain drying of the dielectric product;

a vacuum pump operatively connected with said box-like casing and suitable to be operated to create vacuum conditions inside said process chamber or cavity in a presence of said dielectric product;

an electric generator for generating a radio frequency output signal, at a desired output power;

an applicator, contained in said process chamber or cavity and electrically connected with said electric generator, suitable to develop an electromagnetic field at a treatment zone of said dielectric product defined in said process chamber or cavity for heating said dielectric product;

wherein the applicator includes a pair of polarity opposed electrodes facing each other, arranged one with respect to an opposing other, according to a predetermined configuration; and each of said pair of electrodes include a plurality of consecutively arranged electrodes, each of the plurality of consecutively arranged electrodes having a same polarity or an opposite polarity with respect to an adjacent one of the plurality of consecutively arranged electrodes.

2. The machine according to claim 1, wherein said electric generator includes a generation unit of radiofrequency signals at a first power level and an amplifier, electrically connected with said generation unit, suitable for amplifying said radiofrequency signals of said generation unit from said first power level to said desired output power.

3. The machine according to claim 2, wherein said amplifier comprises one or more amplification stages, each of which includes an active solid state electronic component.

4. The machine according to claim 3, wherein said active solid state electronic component is a semiconductor.

5. The machine according to claim 1, wherein said radio frequency output signal has a frequency of value comprised in a range of 300 Khz through 300 MHz.

6. The machine according to claim 2, wherein said generation unit of radio frequency signals at a first power level comprises a high voltage oscillating/resonant circuit.

7. The machine according to claim 1, wherein said predetermined configuration is of a type in which said polarity-opposed electrodes are facing and parallelly spaced apart from each other in such a way that:

said treatment zone is comprised between said electrodes suitable to be arranged at two opposite sides of said dielectric product, with a positive electrode placed at a first side of said dielectric product and a negative electrode placed at a second side of said dielectric product;

said electromagnetic field generated by said electrodes is predominantly orthogonal to said dielectric product.

8. The machine according to claim 1, wherein said predetermined configuration is of a type in which said polarity-opposed electrodes are facing and parallelly spaced apart each other in such a way that:

said treatment zone is arranged above or below both said electrodes suitable to be arranged at only one side of said dielectric product;

said electromagnetic field generated by said electrodes is predominantly tangential to said dielectric product.

9. The machine according to claim 1, wherein said electrodes comprise components distinct from said box-like casing.

10. The machine according to claim 1, wherein said electrodes comprise two opposite portions of an internal wall of said box-like casing.

11. The machine according to claim 1, further comprising a capacitor interposed between said vacuum pump and said box-like casing.

12. The machine according to claim 1, further comprising a detector for detecting temperature and/or humidity present in said process chamber or cavity, operatively connected with said box-like casing and suitable to adjust an input power of said electric generator and/or a level of said vacuum conditions in said process chamber or cavity.

13. The machine according to claim 1, wherein said radio frequency output signal has a frequency of value of 13.56 MHz or 27.12 MHz or 40.68 MHz.

* * * * *